(12) United States Patent
Beavers et al.

(10) Patent No.: US 10,820,502 B2
(45) Date of Patent: Nov. 3, 2020

(54) COMPENSATION METHOD FOR WIND EFFECTS UPON RESIDUE DISTRIBUTION

(71) Applicant: CNH Industrial America LLC, New Holland, PA (US)

(72) Inventors: James Beavers, Greencastle, PA (US); Neseth Kong, Lancaster, PA (US)

(73) Assignee: CNH Industrial America LLC, New Holland, PA (US)

( * ) Notice: Subject to any disclaimer, the term of this patent is extended or adjusted under 35 U.S.C. 154(b) by 64 days.

(21) Appl. No.: 16/148,044

(22) Filed: Oct. 1, 2018

(65) Prior Publication Data

US 2020/0100427 A1    Apr. 2, 2020

(51) Int. Cl.
*A01D 41/127* (2006.01)
*A01D 41/12* (2006.01)
*A01D 41/06* (2006.01)

(52) U.S. Cl.
CPC ....... *A01D 41/127* (2013.01); *A01D 41/1243* (2013.01); *A01D 41/06* (2013.01)

(58) Field of Classification Search
CPC .. A01D 41/127; A01D 41/1243; A01D 41/06; A01F 12/00; A01F 12/444; A01F 12/446
See application file for complete search history.

(56) References Cited

U.S. PATENT DOCUMENTS

| | | | |
|---|---|---|---|
| 5,569,081 A | 10/1996 | Baumgarten et al. | |
| 7,306,174 B2 | 12/2007 | Pearson et al. | |
| 8,010,262 B2 * | 8/2011 | Schroeder | A01D 41/1243 701/50 |
| 8,463,510 B2 * | 6/2013 | Knapp | A01B 79/005 701/50 |
| 8,585,475 B2 * | 11/2013 | Isaac | A01D 41/1243 460/111 |
| 8,834,244 B2 * | 9/2014 | Isaac | A01D 41/1243 460/111 |

(Continued)

FOREIGN PATENT DOCUMENTS

| | | |
|---|---|---|
| CN | 108243712 A | 7/2018 |
| DE | 102014014049 A1 | 3/2016 |

(Continued)

OTHER PUBLICATIONS

Extended European Search Report for EP Application No. 19200899.3 dated Feb. 27, 2020 (six pages).

*Primary Examiner* — Abigail A Risic
(74) *Attorney, Agent, or Firm* — Peter Zacharias; Patrick Sheldrake

(57) ABSTRACT

A combine including a feeder housing for receiving harvested crop, a separating system for threshing the harvested crop to produce grain and residue, a residue spreader wheel spinning at a speed for expelling the residue from the combine, a residue deflector positioned at an angle for deflecting the expelled residue in a predetermined direction, and a controller. The controller is configured to determine a heading of the combine, determine wind effects on the expelled residue based on an observation of the expelled residue at the determined heading, and adjust at least one of the speed of the residue spreader wheel or the angle of the residue deflector based on the wind effects to achieve a desired residue spread at the determined heading.

20 Claims, 8 Drawing Sheets

(56) References Cited

U.S. PATENT DOCUMENTS

| | | | |
|---|---|---|---|
| 8,924,030 B2* | 12/2014 | Wendte | A01B 79/005 700/283 |
| 9,220,195 B2* | 12/2015 | Eggenhaus | A01D 41/127 |
| 9,313,950 B2 | 4/2016 | Ricketts et al. | |
| 9,516,812 B2* | 12/2016 | Baumgarten | A01D 41/127 |
| 2007/0111766 A1* | 5/2007 | Holmen | A01D 41/1243 460/111 |
| 2008/0248843 A1* | 10/2008 | Birrell | A01F 12/40 460/112 |
| 2008/0268927 A1* | 10/2008 | Farley | A01D 41/1243 460/111 |
| 2009/0099737 A1 | 4/2009 | Wendte et al. | |
| 2009/0287380 A1 | 11/2009 | Chervenka et al. | |
| 2011/0015832 A1* | 1/2011 | Hoyle | A01B 79/005 701/50 |
| 2013/0094899 A1 | 4/2013 | Knapp | |
| 2013/0095899 A1* | 4/2013 | Knapp | A01D 41/1243 460/111 |
| 2014/0032020 A1* | 1/2014 | Guyette | G01S 19/54 701/3 |
| 2014/0302897 A1* | 10/2014 | Isaac | A01D 41/127 460/111 |
| 2015/0351321 A1 | 12/2015 | Shane | |
| 2017/0086372 A1* | 3/2017 | Palla | A01D 41/1243 |
| 2017/0112055 A1 | 4/2017 | Depreitere et al. | |
| 2017/0142900 A1* | 5/2017 | Mahieu | A01D 41/1271 |
| 2018/0310474 A1* | 11/2018 | Posselius | A01D 41/127 |
| 2019/0350132 A1* | 11/2019 | Issac | A01F 12/40 |

FOREIGN PATENT DOCUMENTS

| | | |
|---|---|---|
| DE | 102016215262 A1 | 3/2017 |
| EP | 3153001 A1 | 4/2017 |
| EP | 3300575 A1 | 4/2018 |

* cited by examiner

COMPENSATION METHOD FOR WIND EFFECTS UPON RESIDUE DISTRIBUTION

FIELD

The invention relates to a combine that determines wind effects by observing residue spread on the ground, and then adjusts operational parameters of the residue spreading system accordingly.

BACKGROUND

Harvesters (e.g. combines) are used to harvest crops. Operations performed by these combines include threshing and separating grain from crop residue which is then expelled from the combine by a residue spreader. Operators set residue spreader parameters to achieve a desired spread. However, wind typically alters the spread which may not be desirable to the operator.

SUMMARY

An embodiment includes a combine comprising a feeder housing for receiving harvested crop, a separating system for threshing the harvested crop to produce grain and residue, a residue spreader wheel spinning at a speed for expelling the residue from the combine, a residue deflector positioned at an angle for deflecting the expelled residue in a predetermined direction, and a controller. The controller is configured to determine a heading of the combine, determine wind effects on the expelled residue based on an observation of the expelled residue at the determined heading, and adjust at least one of the speed of the residue spreader wheel or the angle of the residue deflector based on the wind effects to achieve a desired residue spread at the determined heading.

An embodiment includes a method for controlling a combine including a feeder housing for receiving harvested crop, separating system for threshing the harvested crop to produce grain and residue, a residue spreader wheel spinning at a speed for expelling the residue from the combine, a residue deflector positioned at an angle for deflecting the expelled residue in a direction, and a controller. The method comprising determining, by the controller, a heading of the combine, determining, by the controller, wind effects on the expelled residue based on an observation of the expelled residue at the determined heading, and adjusting, by the controller, at least one of the speed of the residue spreader wheel or the angle of the residue deflector based on the wind effects to achieve a desired residue spread at the determined heading.

DETAILED DESCRIPTION

Aspects of the invention provide methods and systems for operating a combine to automatically compute a fire risk based on various factors, and indicate this fire risk to the operator of the combine.

The terms "grain," "straw," and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, material other than grain (MOG) or straw. Incompletely threshed crop material is referred to as "tailings." Also the terms "forward," "rearward," "left," and "right", when used in connection with the agricultural harvester (e.g. combine) and/or components thereof are usually determined with reference to the direction of forward operative travel of the combine, but again, they should not be construed as limiting. The terms "longitudinal" and "transverse" are determined with reference to the fore-and-aft direction of the agricultural combine and are equally not to be construed as limiting.

Figure 1A:
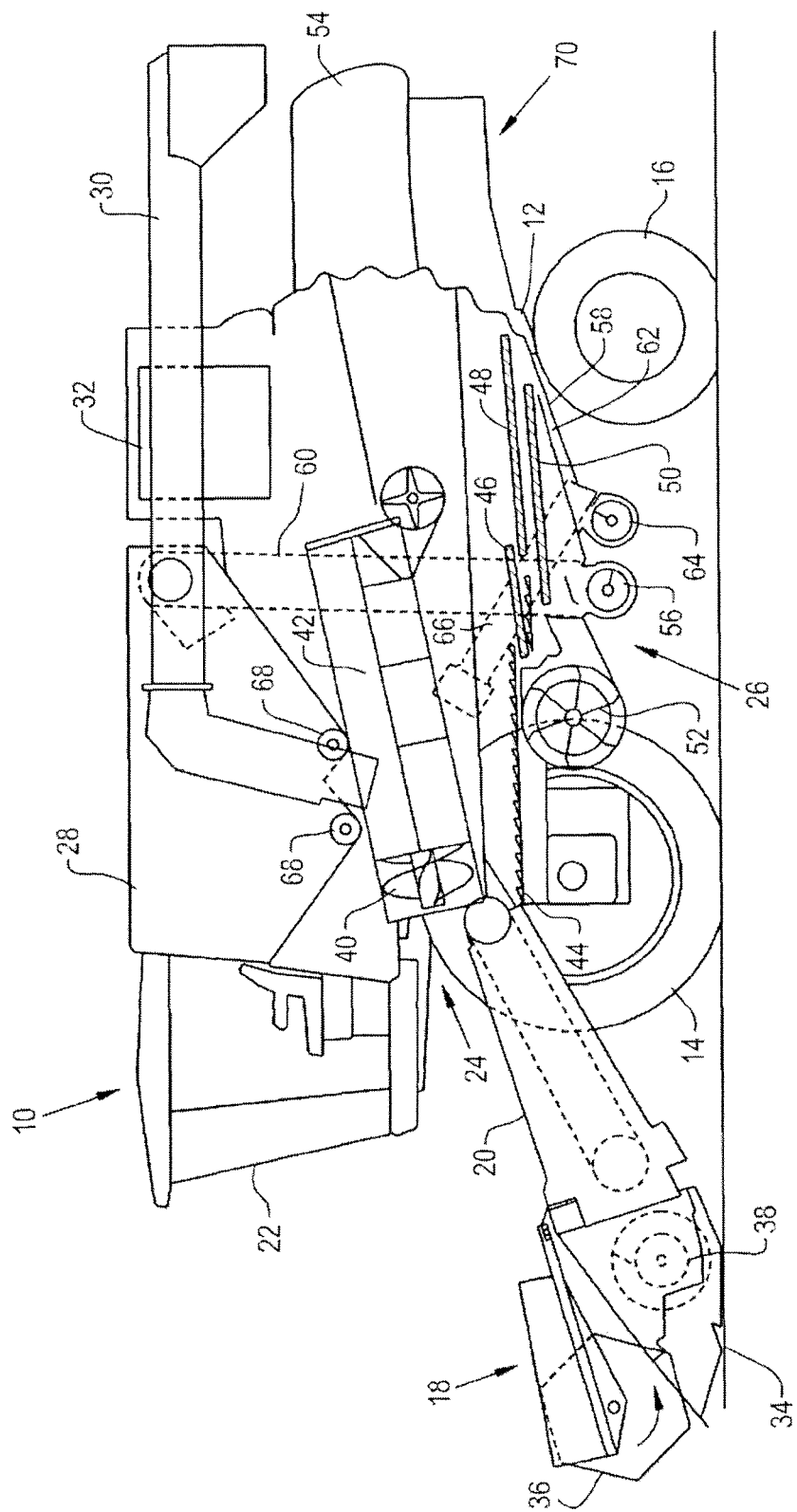
FIG. 1A is a side view of a combine, according to an embodiment of the invention.

Referring now to the drawings, and more particularly to FIG. 1A, there is shown one embodiment of an agricultural harvester in the form of a combine 10, which generally includes a chassis 12, ground engaging wheels 14 and 16, a header 18, a feeder housing 20, an operator cab 22, a threshing and separating system 24, a cleaning system 26, a grain tank 28, and an unloading auger 30.

Front wheels 14 are larger flotation type wheels, and rear wheels 16 are smaller steerable wheels. Motive force is selectively applied to front wheels 14 through a power plant in the form of a diesel engine 32 and a transmission (not shown). Although combine 10 is shown as including wheels, is also to be understood that combine 10 may include tracks, such as full tracks or half-tracks.

Header 18 is mounted to the front of combine 10 and includes a cutter bar 34 for severing crops from a field during forward motion of combine 10. A rotatable reel 36 feeds the crop into header 18, and a double auger 38 feeds the severed crop laterally inwardly from each side toward feeder housing 20. Feeder housing 20 conveys the cut crop to threshing and separating system 24, and is selectively vertically movable using appropriate actuators, such as hydraulic cylinders (not shown).

Threshing and separating system 24 is of the axial-flow type, and generally includes a rotor 40 at least partially enclosed by and rotatable within a corresponding perforated concave 42. The cut crops are threshed and separated by the rotation of rotor 40 within concave 42, and larger elements, such as stalks, leaves and the like are discharged from the rear of combine 10. Smaller elements of crop material including grain and non-grain crop material, including particles lighter than grain, such as chaff, dust and straw, are discharged through perforations of concave 42.

Grain which has been separated by the threshing and separating assembly 24 falls onto a grain pan 44 and is conveyed toward cleaning system 26. Cleaning system 26 may include an optional pre-cleaning sieve 46, an upper sieve 48 (also known as a chaffer sieve), a lower sieve 50 (also known as a cleaning sieve), and a cleaning fan 52. Grain on sieves 46, 48 and 50 is subjected to a cleaning action by fan 52 which provides an airflow through the sieves to remove chaff and other impurities such as dust from the grain by making this material airborne for discharge from straw hood 54 of combine 10. Grain pan 44 and pre-cleaning sieve 46 oscillate in a fore-to-aft manner to transport the grain and finer non-grain crop material to the upper surface of upper sieve 48. Upper sieve 48 and lower sieve 50 are vertically arranged relative to each other, and likewise oscillate in a fore-to-aft manner to spread the grain across sieves 48, 50, while permitting the passage of cleaned grain by gravity through the openings of sieves 48, 50.

Clean grain falls to a clean grain auger 56 positioned crosswise below and in front of lower sieve 50. Clean grain auger 56 receives clean grain from each sieve 48, 50 and from bottom pan 58 of cleaning system 26. Clean grain auger 56 conveys the clean grain laterally to a generally vertically arranged grain elevator 60 for transport to grain tank 28. Tailings from cleaning system 26 fall to a tailings auger trough 62. The tailings are transported via tailings auger 64 and return auger 66 to the upstream end of cleaning system 26 for repeated cleaning action. A pair of grain tank augers 68 at the bottom of grain tank 28 convey the clean grain laterally within grain tank 28 to unloading auger 30 for discharge from combine 10.

Figure 1B:
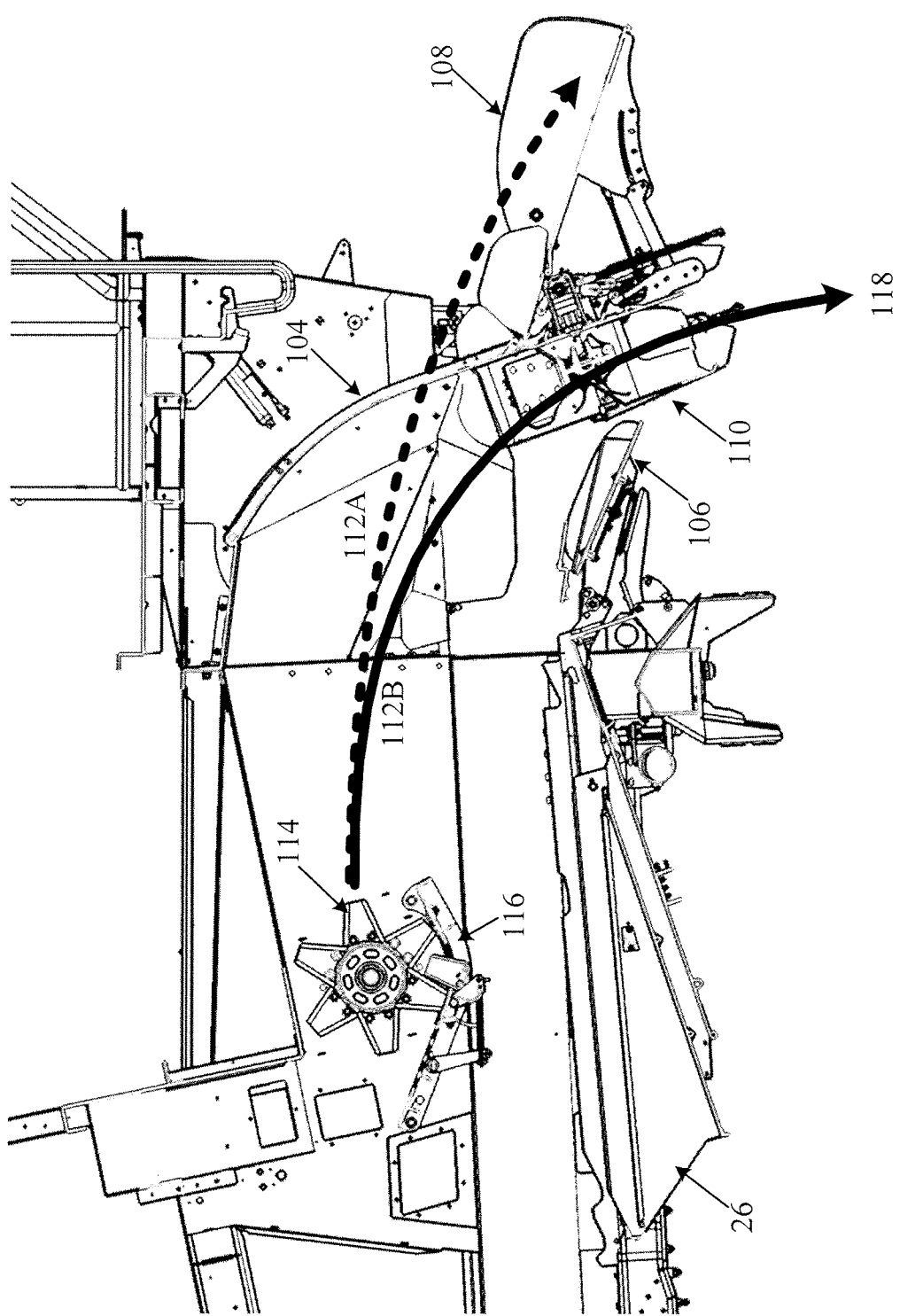
FIG. 1B is a section view of a combine residue system, according to an embodiment of the invention.

The non-grain crop material proceeds through a residue handling system 70. Residue handling system 70 includes a chopper, a chopper pan, counter knives, a windrow door and a residue spreader. When combine 10 operating in the chopping and spreading mode, the chopper is set to a relatively high speed (e.g. 3,000 RPM), the counter knives may be engaged, the windrow door is closed and the residue spreader is running (e.g. rotating). This causes the non-grain crop material to be chopped in to pieces of approximately 6 inches or less and spread on the ground, via path 112B as shown in FIG. 1B, in a fairly uniform manner. In contrast, when combine 10 is operating in the windrow mode, the chopper is at a relatively low speed (e.g. 800 RPM), the counter knives are disengaged and the windrow door is open. The residue spreader may continue operation to spread only the chaff, with the crop material passing, via path 112A as shown in FIG. 1B, through the passageway created by the open windrow door.

For sake of clarity, details of residue system 70 are also shown in FIG. 1B. For example, as shown in FIG. 1B, residue system 70 includes a windrow door 104, a spreader chute 106, a windrow chute 108, spreader wheel system 110, spreader deflectors (not shown), chopper 114 and chopper pan 116.

Although not shown in FIG. 1B, windrow door 104, spreader wheel system 110, spreader deflectors, and chopper 114 are electrically connected to a controller (e.g. programmable logic controller, micro-controller, etc.) located in the combine. The controller is programmable by the operator of the combine through a user (e.g. operator) interface, or through a remote computer (see FIG. 3). The operator, for example, enters commands through the user interface. In response to these commands, the controller sends control signals to the various actuators of residue handling system 70.

Figure 1C:
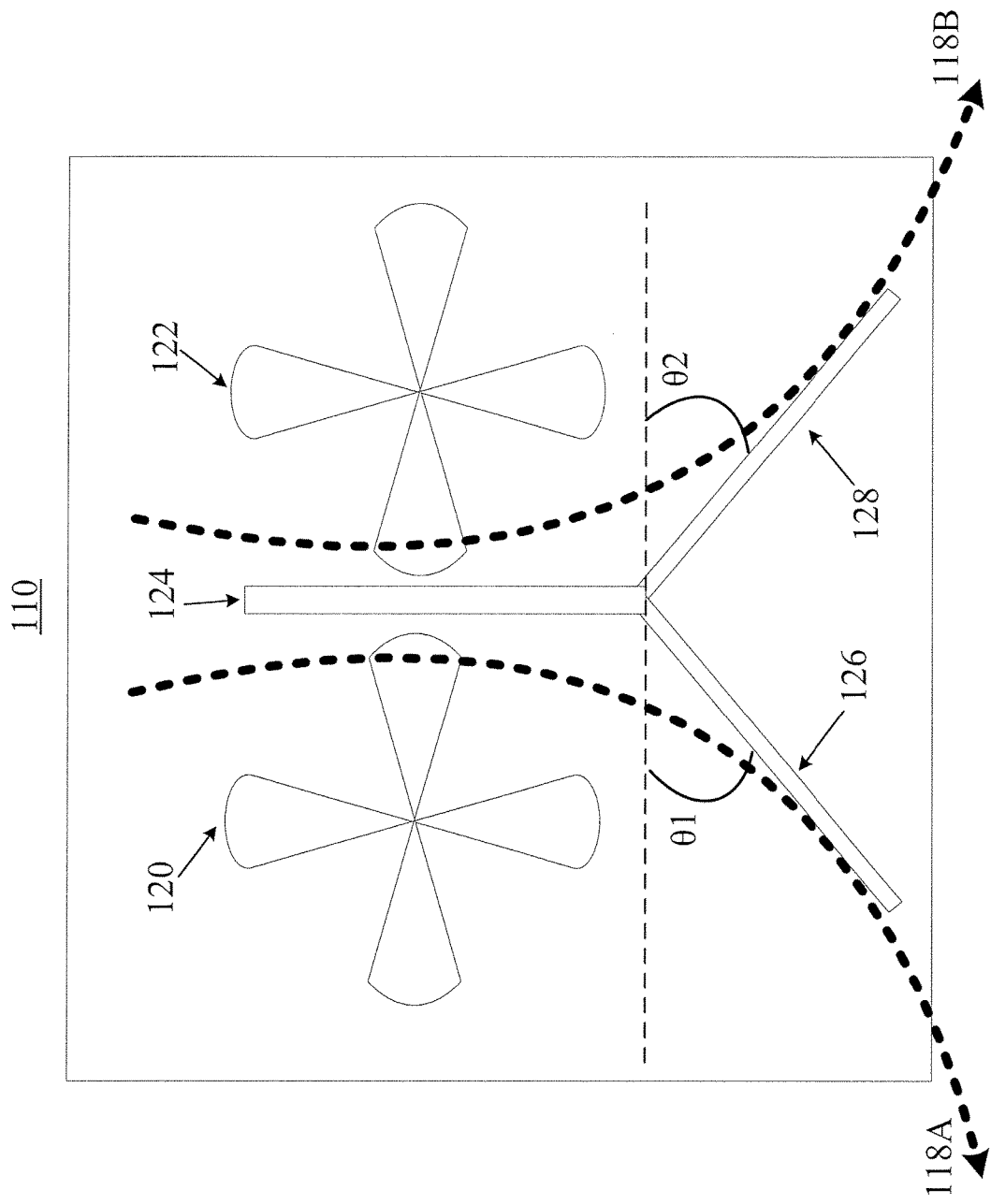
FIG. 1C is a section view of the residue spreader, according to an embodiment of the invention.

As mentioned above, residue handling system 70 spreads the chopped up residue via path 112B as shown in FIG. 1B. Further details of the spreader wheel system and spreader deflectors are shown in FIG. 1C. Spreader wheel system 110 is shown to include driver-side spreader wheel 120, passenger-side spreader wheel 122, optional divider 124, driver-side deflector 126, and passenger-side deflector 128. In general, spreader wheels 120 and 122 rotate at a predetermined speed ejecting residue from the combine via paths 118A and 118B respectively which are affected by both the speeds (RPM1, RPM2) of wheels 120 and 122, and the angles ($\theta 1$, $\theta 2$) of deflectors 126 and 128. This allows the combine to control the speed and angle at which the residue is ejected from the residue system. These variables (wheel speeds and deflector angles) are controlled to produce a desirable (e.g. uniform) residue spread on the ground as harvesting is performed.

Figure 2:
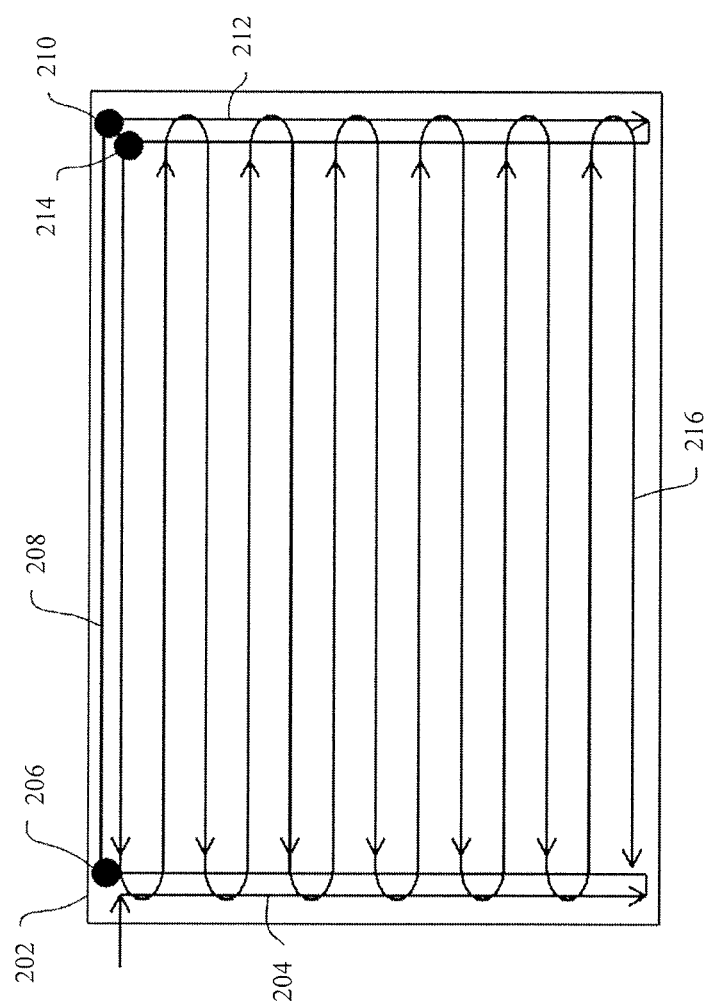
FIG. 2 is a typical path traversed by the combine during harvesting, according to an embodiment of the invention.

The pathways shown in FIG. 2 are typical for a plot of land 202 that is to be harvested. Typically, as harvesting is performed, the combine may employ residue system 70 to perform spreading and/or windrowing of the harvested crops at different locations of the field. For example, the combine may start performing spreading along path 204. Once the combine reaches point 208, a turn is made and spreading is performed along path 206. Once the combine reaches point 210, a turn is made and spreading is performed along path 212. Finally, once the combine reaches point 214, a turn is made and windrowing is performed in a zig-zag pattern along path 216.

In the spreading zones (e.g. while traveling the pathways shown in FIG. 2), the combine controls the wheel 120, 122 speeds and deflector 126, 128 angles in the residue system to achieve a desirable residue spread. These variables may initially be set manually by the combine operator, or they may initially be set by the combine controller. When setting these variables manually, the operator may use a number of factors including but not limited to their experience, combine heading, crop type, and weather forecasts (e.g. wind speed/direction). When setting these variables automatically, the combine controller may use a number of factors including but not limited to past results, combine heading, crop type and weather forecasts (e.g. wind speed/direction).

Once the wheel 120, 122 speeds and deflector 126, 128 angles are initially set, the combine monitors its heading and automatically adjusts the wheel 120, 122 speeds and deflector 126, 128 based on observable output of the spreader. For example, in the manual adjustment scenario, the initial wheel 120, 122 speeds and deflector 126, 128 angles are set either using predetermined values or based on operator experience. The operator may take wind forecast, heading and the type of crop into consideration when making this decision. Once harvesting begins, the operator is able to visually observe the residue spread. If the residue spread is desirable, the operator can simply continue harvesting. As the heading of the combine changes, the controller automatically adjusts the spreader wheel 120, 122 speeds and/or the deflector 126, 128 angles due to theoretical wind effects (e.g. wind forecast).

For example, with reference to FIG. 1C, if the combine is initially traveling on a northbound heading with a wind coming out of the east (e.g. wind blowing the residue from right to left in FIG. 1C), deflector 126 may be angled at a large angle (e.g. 90°) while deflector 128 may be angled at a small angle (e.g. 45°). However, if the combine turns and travels on a southbound heading with the same wind coming out of the east (e.g. wind blowing the residue from left to right in FIG. 1C), deflector angles may be swapped to deal with the opposite wind effect, such that deflector 126 is angled at a small angle (e.g. 45°) while deflector 128 may be angled at a large angle (e.g. 90°). Speeds of wheels 120 and 122 may also increase and decrease to compensate for theoretical wind effects (e.g. increased wheel speed in response to increased wind).

It is known, however, that actual wind effects vary from the weather forecast throughout the day. For example, wind effects (speed and direction) at the location of the combine at any given moment will likely be somewhat different than the wind effects forecast by a weather program. This is in part due to the fact that wind effects are not constant throughout the day and vary based on location, terrain and other factors. Thus, a combine that has a set residue wheel 120, 122 speeds and deflector 126, 128 angles based on the weather forecast, may not produce a desirable output due to variations in wind effects. It is therefore beneficial for the combine to determine wind effects through feedback, and then use these wind effects to perform adjustments on the residue wheel 120, 122 speeds and deflector 126, 128 angles.

Figure 3:
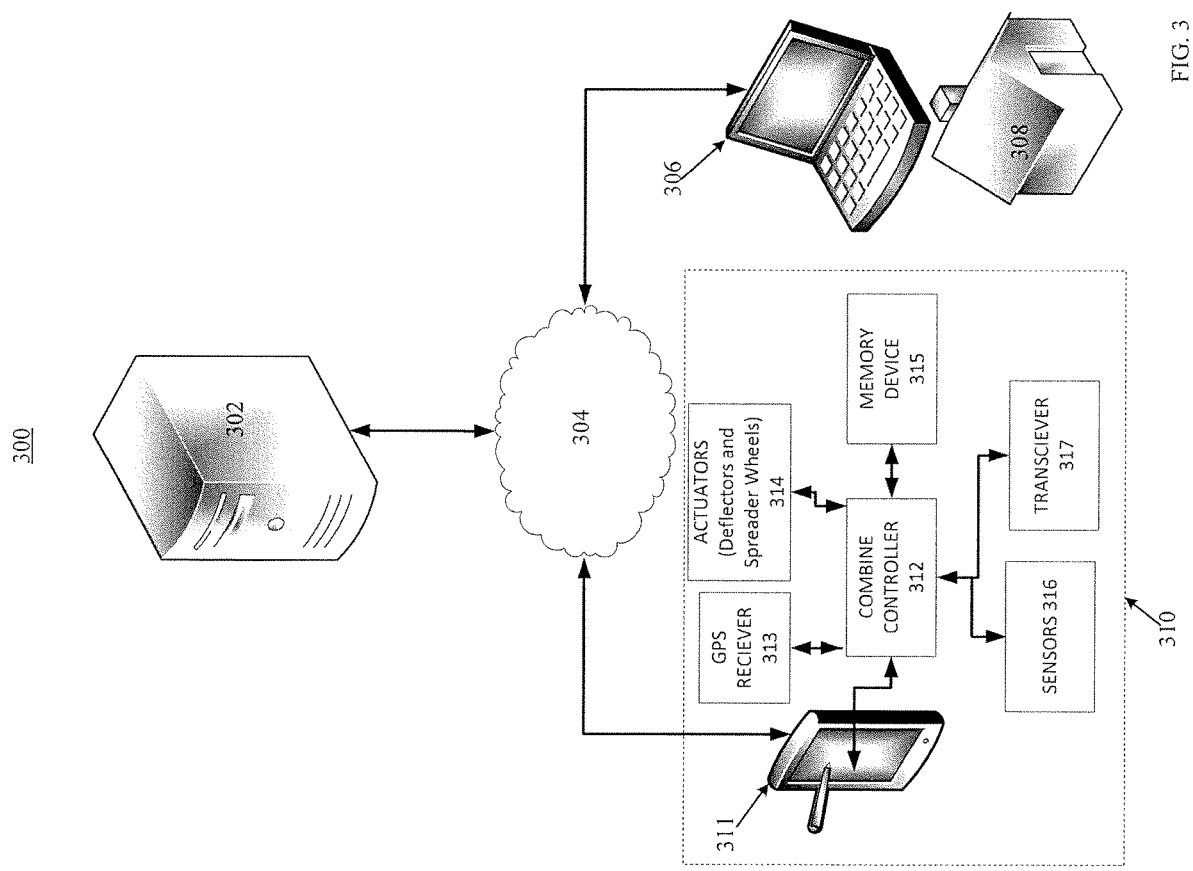
FIG. 3 is a system view of network based communication between the combine controller, a remote personal computer and a server, according to an embodiment of the invention.

Determining wind effects on the residue spread can be performed while in the combine via a user interface. FIG. 3 shows an example of a system, generally designated as 300, for controlling the combine. The system 300 comprises a control system 310 of combine 10, a remote PC 306 at location 308, and a remote server 302. The control system 310 of the combine 10 communicates with the remote PC 306 and the remote server 302 over a network 304 (e.g., the Internet). It should be noted that combine 10 does not have to be connected to other devices through the network 304. The controller 310 of combine 10 can alternatively be a standalone system that receives operating instructions (e.g. spreader wheel speeds and deflector angles) through a user interface, or through a removable memory device (e.g. Flash Drive).

Prior to operating combine 10, an operator designates spreader wheel 120, 122 speeds and deflector 126, 128 angles based on the crop type and based on predicted wind effects (e.g. weather forecast). In one example, the operator uses an interface 311 of the combine control system 310 or the remote PC 306 located at remote location 308 to designate the spreader wheel 120, 122 speeds and deflector angles. Interface 311 and PC 306 allow the operator to view locally stored parameters from a memory device 315 of the control system 310 and/or download parameters, via a transceiver 317 (e.g. WiFi, Bluetooth, Cellular, etc.) of the control system 310, from server 302 through network 304. The operator may set (via the interface 311 or PC 306) appropriate parameters (e.g. crop type, wind speed, wind direction, initial spreader wheel 120, 122 speeds, initial deflector 126, 128 angles, etc.). Once the parameters are selected, the operator can begin harvesting. The control system 310, specifically a controller 312 thereof, then controls actuators 314 (e.g. spreader wheels and deflectors) based on these initial parameters and monitors sensors 316 (e.g. spreader angle sensor, wheel speed sensor, camera, ultrasonic sensor, infrared sensor, etc.) to achieve a desirable residue spread. A GPS receiver 313 of the control system 310 and/or dead reckoning sensors (not shown) may also be used to track the path of the combine and its heading. This information (e.g. heading) may be used to automatically adjust the spreader wheel 120, 122 speeds and deflector 126, 128 angles to account for wind effects.

Figure 4:
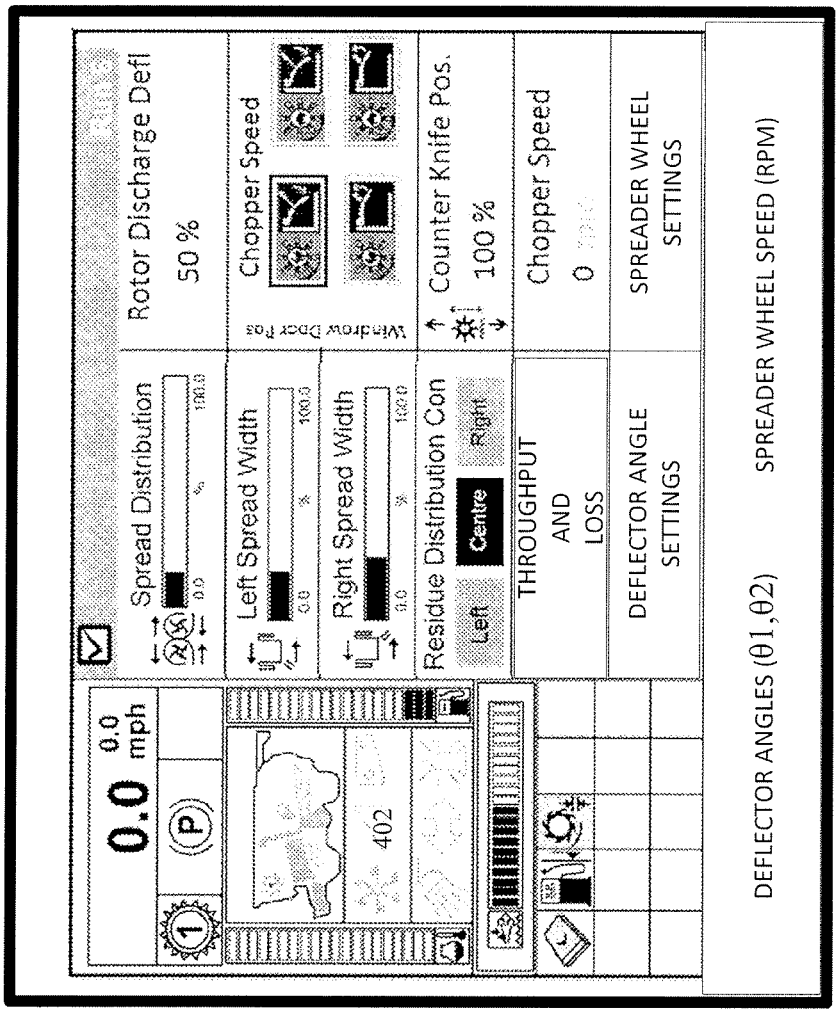
FIG. 4 is an illustration of a user interface for monitoring and controlling the combine, according to an embodiment of the invention.

An example of interface 311 is shown in FIG. 4 where various parameters and data are displayed to the operator through a graphical user interface (GUI) 400. These may include a view of the map 402 with designated zones (e.g. spreading zones), land grade (not shown), current operational mode (spreading/windrow modes), and operational parameters/states for the spreader wheels, chopper, counter knives, windrow door, spreader wheels, spreader deflectors, etc. These parameters (e.g. spreader wheel speeds and deflector angles) may be set or changed by the operator prior to harvesting or during harvesting. For example, the operator can use a stylus or their finger on the touchscreen to set spreader wheel speeds, deflector angles, wind effects, etc.

Figure 5A:
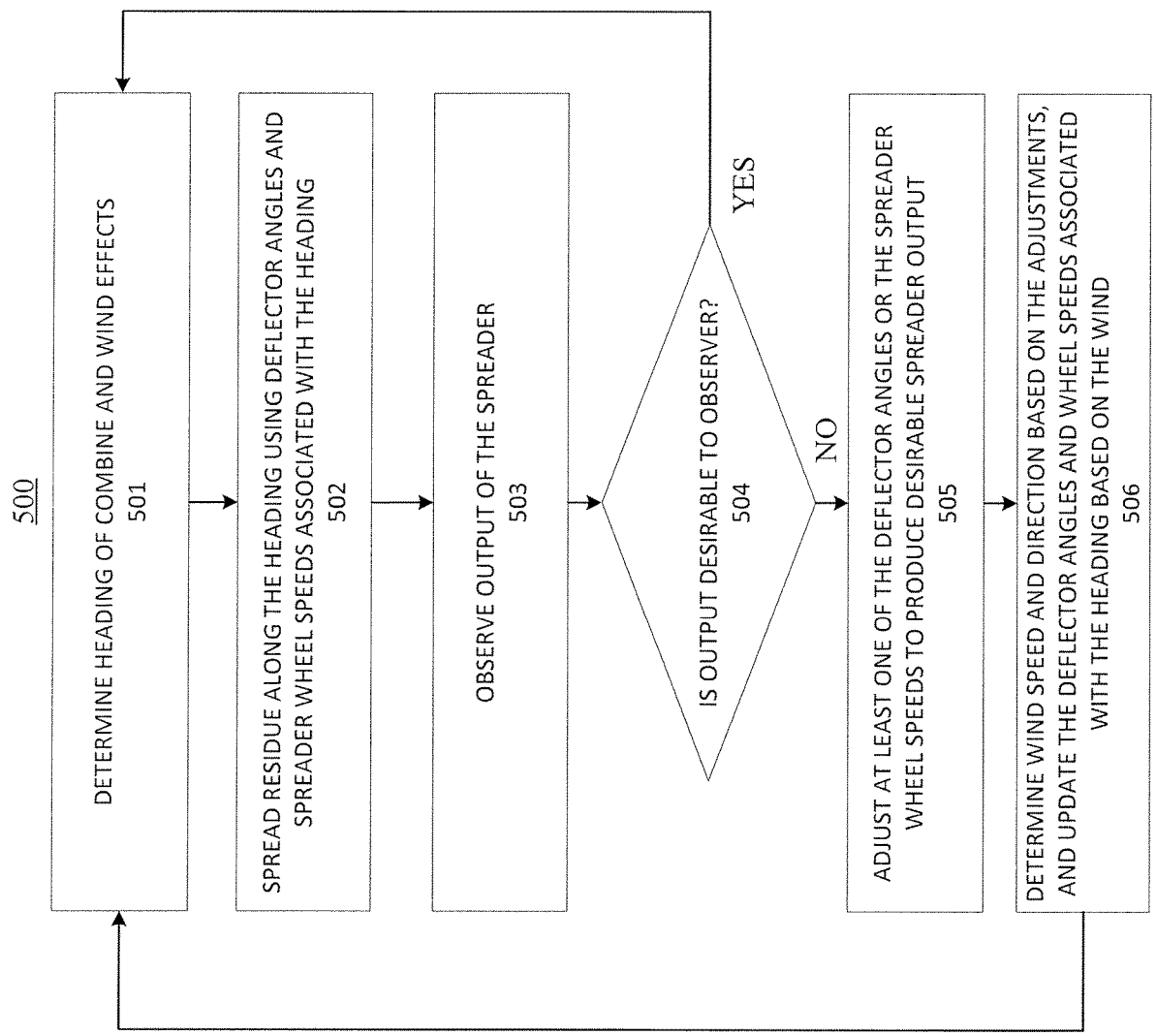
FIG. 5A is a flowchart of steps for controlling spreader parameters based on determined wind effects, according to an embodiment of the invention.
Figure 5B:
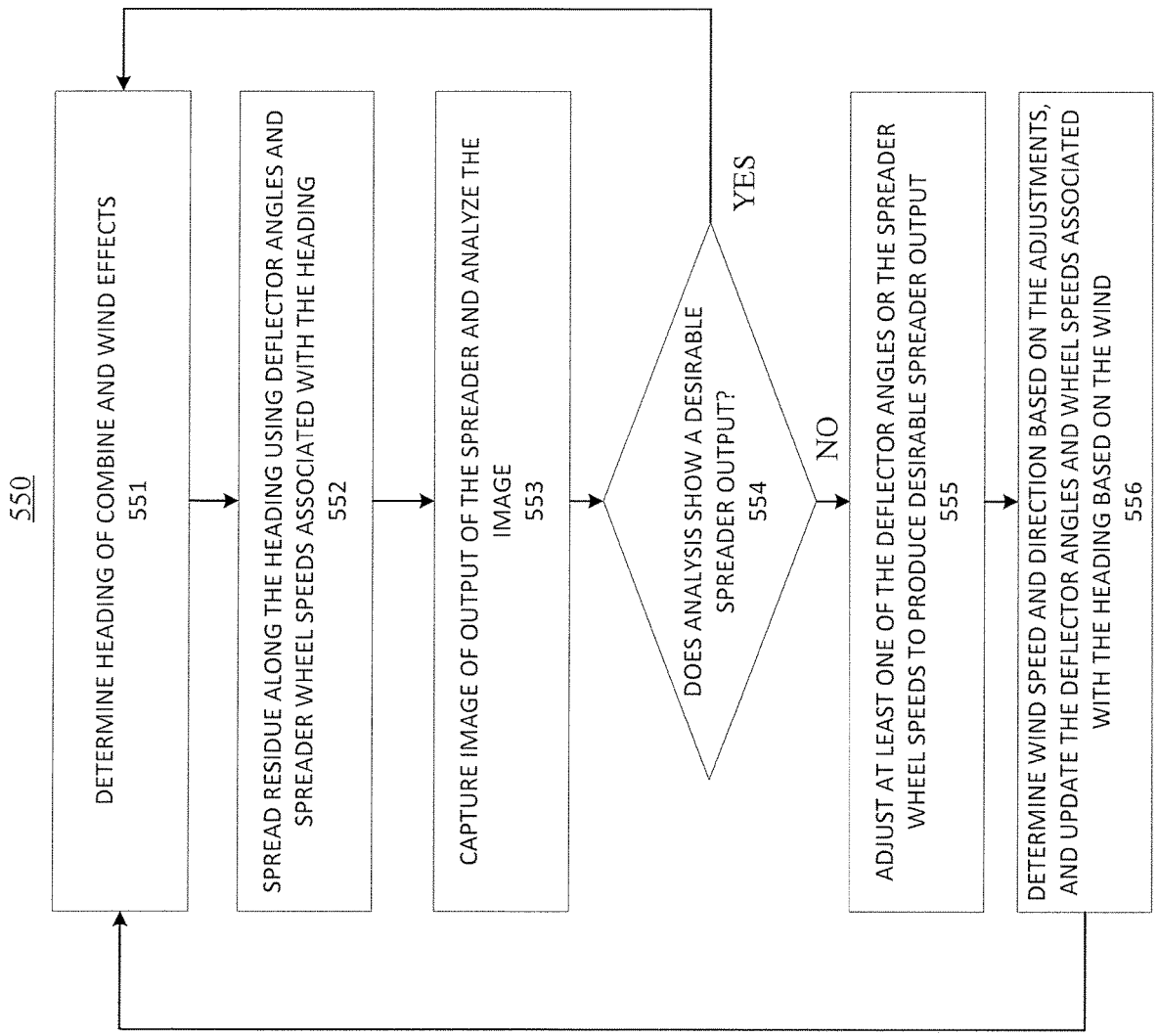
FIG. 5B is a flowchart of steps for controlling spreader parameters based on determined wind effects, according to an embodiment of the invention.

FIGS. 5A and 5B show flowcharts for controlling the spreader wheel 120, 122 speeds and deflector angles based on observable wind effects. FIG. 5A shows a flowchart of a method 500 of determining wind effects from operator feedback. FIG. 5B shows a flowchart of a method 550 for determining wind effects from sensor feedback.

In step 501 of FIG. 5A, the controller determines heading of the combine by using GPS data through the GPS receiver 313, or by receiving operator input through the interface 311. The controller 312 also determines initial wind effects by receiving a weather forecast through the transceiver 317, or by receiving operator input through the interface (e.g. the operator can enter wind speed and direction). In step 502, the controller 312 determines and executes appropriate spreader wheel 120, 122 speeds and deflector 126, 128 angles to produce a desirable residue spread based on the wind effects, heading and other information such as crop type. In step 503, the operator then observes (e.g. through a mirror or through a video feed from a camera located at the rear of the combine) the residue spread on the ground. If the residue spread is deemed by the operator in step 504 to be desirable, no adjustments to the wheel 120, 122 speeds and deflector 126, 128 angles are made. However, if the residue spread is deemed by the operator in step 504 to be undesirable, adjustments to the wheel 120, 122 speeds and deflector 126, 128 angles are made in step 505. For example, the wheel 120, 122 speeds may be increased or decreased, and the deflector 126, 128 angles may be increased or decreased until the observable residue spread is desirable (e.g. uniformly spread on the ground). Once these adjustments are made, the controller 312, in step 506, computes an adjustment to the wind speed and the wind direction, and then uses these adjusted values for controlling the wheel 120, 122 speeds and deflector 126, 128 angles for further harvesting.

Initially determining and then adjusting the wind speed and the wind direction may be performed in a number of different manners. For example, the initial wind speed and the wind direction may simply be determined based on a weather forecast (e.g. wind blowing East©10 mph). The controller may use this information along with heading and crop type to retrieve corresponding spreader wheel speeds (e.g. 500 rpm, 500 rpm) and deflector angles (45°, 45°) from a pre-stored table that is populated based on experiments, operator experience, algorithms, or the like. When the operator adjusts the wheel speeds and/or the deflector angles during harvesting, the controller determines that the initial wind effects are incorrect, and adjusts these values. For example, when the combine is traveling North and the operator changes the deflector angles to (65°, 25°), the controller may look to the table and determine a wind speed and direction (e.g. wind is blowing harder from the East©20 mph) that corresponds to deflector angles of (65°, 25°). This updated wind speed and direction are then used to retrieve appropriate spreader wheel 120, 122 speeds and deflector 126, 128 angles to achieve desirable residue spread. Thus, as harvesting continues, the controller looks up spreader wheel 120, 122 speeds and deflector 126, 128 angles that are associated with the determined and/or adjusted wind speed, wind direction, combine heading and crop type.

The method 500 described in FIG. 5A requires operator feedback to determine the adjusted wind effects. In contrast, the method 550 described in FIG. 5B does not require operator feedback and is fully autonomous. For example, in step 551 of FIG. 5B, the controller 312 determines heading of the combine 10 by using GPS data through the GPS receiver 313, or by receiving operator input through the interface 311. The controller 312 also determines initial wind effects by receiving a weather forecast through the transceiver 317, or by receiving operator input through the interface 311. In step 552, the controller 312 determines and executes appropriate spreader wheel 120, 122 speeds and deflector 126, 128 angles to produce a desirable residue spread based on the wind effects, heading and other information such as crop type. In step 553, however, a sensor 316 (e.g., camera) is mounted to the rear of the combine and captures images of the residue spread on the ground. The controller 312 then analyzes the images using known image processing techniques to determine the desirability of the spread. If the residue spread is deemed by the controller 312 in step 554 to be desirable, no adjustments to the wheel 120, 122 speeds and deflector 126, 128 angles are made. However, if the residue spread is deemed by the controller 312 in step 554 to be undesirable, adjustments to the wheel 120, 122 speeds and deflector 126, 128 angles are made by the controller in step 555. For example, the wheel 120, 122 speeds may be increased or decreased, and the deflector 126, 128 angles may be increased or decreased until the observable residue spread is desirable (e.g. uniformly spread on the ground). Once these adjustments are made, the controller, in step 556, computes an adjustment to the wind speed and the wind direction, and then uses these adjusted values for controlling the wheel 120, 122 speeds and deflector 126, 128 angles for further harvesting.

Initially determining and then adjusting the wind speed and the wind direction may be performed in a number of different manners. For example, the initial wind speed and the wind direction may simply be determined based on a weather forecast (e.g., wind blowing East@10 mph). The controller may use this information along with heading and crop type to retrieve corresponding spreader wheel 120, 122 speeds and deflector 126, 128 angles from a pre-stored table that is populated based on experiments, operator experience, algorithms, or the like. When the controller adjusts the wheel speeds and/or the deflector angles during harvesting, in response to the image processing, the controller makes a determination that the initial wind effects are incorrect, and adjusts these values accordingly. This updated wind speed and direction are then used to retrieve appropriate spreader wheel 120, 122 speeds and deflector 126, 128 angles to achieve desirable residue spread. Thus, as harvesting continues, the controller looks up spreader wheel 120, 122 speeds and deflector 126, 128 angles that are associated with the determined wind speed, wind direction, heading and crop type.

Steps 501-506 and 551-556 shown in FIGS. 5A and 5B respectively are performed by controller 312 upon loading and executing software code or instructions which are tangibly stored on a tangible computer readable medium 315, such as on a magnetic medium, e.g., a computer hard drive, an optical medium, e.g., an optical disc, solid-state memory, e.g., flash memory, or other storage media known in the art. Thus, any of the functionality performed by the controller 312 described herein, such as the steps shown in FIGS. 5A and 5B, are implemented in software code or instructions which are tangibly stored on a tangible computer readable medium. Upon loading and executing such software code or instructions by the controller 312, the controller 312 may perform any of the functionality of the controller 312 described herein, including the steps shown in FIGS. 5A and 5B described herein.

The term "software code" or "code" used herein refers to any instructions or set of instructions that influence the operation of a computer or controller 312. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

Although the invention is illustrated and described herein with reference to specific embodiments, the invention is not intended to be limited to the details shown. Rather various modifications may be made in the details within the scope and range of equivalence of the claims and without departing from the invention.

The invention claimed is:

1. A combine comprising:
   a feeder housing for receiving harvested crop;
   a separating system for threshing the harvested crop to produce grain and residue;
   a residue spreader wheel spinning at a speed for expelling the residue from the combine;
   a residue deflector; and
   a controller configured to:
   1) determine a heading of the combine,
   2) receive a weather forecast,
   3) based on the determined heading of the combine and the received weather forecast, set an initial value of an angle of the residue deflector for deflecting the expelled residue in a predetermined direction;
   4) determine wind effects on the expelled residue based on an observation of the expelled residue at the determined heading, and
   5) adjust the speed of the residue spreader wheel and the angle of the residue deflector based on the wind effects to achieve a desired residue spread at the determined heading.

2. The combine of claim 1, further comprising:
   another residue spreader wheel spinning at another speed for expelling the residue from the combine; and
   another residue deflector positioned at another angle for deflecting the expelled residue in a another direction,
   wherein the controller is further configured to adjust at least one of the speed of the other residue spreader wheel or the angle of the other residue deflector based on the wind effects to achieve a desired residue spread at the determined heading.

3. The combine of claim 1,
   wherein the controller is further configured to determine wind effects based on a speed and a direction of the wind.

4. The combine of claim 1,
   wherein the controller is further configured to associate at least one of the adjusted speed of the residue spreader wheel or the adjusted angle of the residue deflector with the determined heading.

5. The combine of claim 1,
wherein the controller is further configured to:
store the determined heading, the adjusted speed of the residue spreader wheel, and the adjusted angle of the residue deflector to a table, and
retrieve the adjusted speed of the residue spreader wheel and the adjusted angle of the residue deflector when the combine is traveling on the determined heading.

6. The combine of claim 1,
wherein the controller is further configured to:
receive the observation as input from the operator of the combine, the observation indicating a correction factor, and
determine the wind effects based on the correction factor.

7. The combine of claim 1,
wherein the controller is further configured to:
receive the observation as a captured image of the expelled residue, and
determine the wind effects by analyzing the image.

8. The combine of claim 1,
wherein the controller is further configured to periodically perform steps 1-3 to ensure desired residue spread.

9. The combine of claim 1,
wherein the controller is further configured to:
detect a new heading of the combine, and
adjust the speed of the residue spreader wheel or the angle of the residue deflector based on the wind effects of the new heading.

10. The combine of claim 1,
wherein the controller is further configured to compute the heading of the combine by using at least one of a global positioning system (GPS) receiver or dead reckoning sensors.

11. A method for controlling a combine including a feeder housing for receiving harvested crop, separating system for threshing the harvested crop to produce grain and residue, a residue spreader wheel spinning at a speed for expelling the residue from the combine, a residue deflector, and a controller, the method comprising:
1) determining, by the controller, a heading of the combine;
2) receiving, by the controller, a weather forecast;
3) based on the determined heading of the combine and the received weather forecast, setting, by the controller, an initial value of an angle of the residue deflector for deflecting the expelled residue in a predetermined direction;
4) determining, by the controller, wind effects on the expelled residue based on an observation of the expelled residue at the determined heading; and
5) adjusting, by the controller, the speed of the residue spreader wheel and the angle of the residue deflector based on the wind effects to achieve a desired residue spread at the determined heading.

12. The method of claim 11, further comprising:
adjusting, by the controller, at least one of a speed of another residue spreader wheel or an angle of another residue deflector based on the wind effects to achieve a desired residue spread at the determined heading.

13. The method of claim 11, further comprising:
determining, by the controller, wind effects based on a speed and a direction of the wind.

14. The method of claim 11, further comprising:
associating, by the controller, at least one of the adjusted speed of the residue spreader wheel or the adjusted angle of the residue deflector with the determined heading.

15. The method of claim 11, further comprising:
storing, by the controller, the determined heading, the adjusted speed of the residue spreader wheel, and the adjusted angle of the residue deflector to a table; and
retrieving, by the controller, the adjusted speed of the residue spreader wheel and the adjusted angle of the residue deflector when the combine is traveling on the determined heading.

16. The method of claim 11, further comprising:
receiving, by the controller, the observation as input from the operator of the combine, the observation indicating a correction factor; and
determining, by the controller, the wind effects based on the correction factor.

17. The method of claim 11, further comprising:
receiving, by the controller, the observation as a captured image of the expelled residue; and
determining, by the controller, the wind effects by analyzing the image.

18. The method of claim 11, further comprising:
periodically performing, by the controller, steps 1-3 to ensure desired residue spread.

19. The method of claim 11, further comprising:
detecting, by the controller, a new heading of the combine; and
adjusting, by the controller, the speed of the residue spreader wheel or the angle of the residue deflector based on the wind effects on the new heading.

20. The method of claim 11, further comprising:
computing, by the controller, the heading of the combine by using at least one of a global positioning system (GPS) receiver or dead reckoning sensors.

* * * * *